(12) United States Patent
Olivereau et al.

(10) Patent No.: US 9,774,585 B2
(45) Date of Patent: Sep. 26, 2017

(54) METHOD AND DEVICE FOR FORMING A SECURE WIRELESS NETWORK WITH LIMITED RESOURCES

(71) Applicant: COMMISSARIAT A L'ENERGIE ATOMIQUE ET AUX ENERGIES ALTERNATIVES, Paris (FR)

(72) Inventors: Alexis Olivereau, Gif-sur-Yvette (FR); Nouha Oualha, Gif-sur-Yvette (FR); Christophe Janneteau, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 72 days.

(21) Appl. No.: 14/778,025

(22) PCT Filed: Mar. 27, 2014

(86) PCT No.: PCT/EP2014/056174
§ 371 (c)(1),
(2) Date: Sep. 17, 2015

(87) PCT Pub. No.: WO2014/154813
PCT Pub. Date: Oct. 2, 2014

(65) Prior Publication Data
US 2016/0285844 A1    Sep. 29, 2016

(30) Foreign Application Priority Data
Mar. 28, 2013   (FR) ...................... 13 52815

(51) Int. Cl.
*G06F 7/04*      (2006.01)
*H04L 29/06*     (2006.01)
(Continued)

(52) U.S. Cl.
CPC .............. *H04L 63/08* (2013.01); *H04L 9/083* (2013.01); *H04L 63/06* (2013.01); *H04L 63/10* (2013.01);
(Continued)

(58) Field of Classification Search
CPC ................................ H04L 63/08; H04L 9/083
(Continued)

(56) References Cited

U.S. PATENT DOCUMENTS

2006/0083200 A1\* 4/2006 Emeott ................... H04L 9/083
                                                       370/331
2008/0031155 A1\* 2/2008 Korus ..................... H04L 63/20
                                                       370/254

OTHER PUBLICATIONS

Suraj Kumar et al., "SCRMP: Secure Cluster Based Mulitpath Routing Protocol for Wireless Sensor Networks," 2010 Sixth International Conference on Wireless Communication and Sensor Networks, Dec. 15, 2010, pp. 1-6, XP031913870.
(Continued)

*Primary Examiner* — Anthony Brown
(74) *Attorney, Agent, or Firm* — Baker & Hostetler LLP

(57) ABSTRACT

A method and a device for forming a secure wireless network for nodes with limited resources, between which no previous trust relationship exists is provided. The method can be used to generate a list of neighboring nodes for a requesting node and subsequently establish a secure channel between the requesting node and an authentication entity. A security association is established with each neighboring node on the basis of a master session key received via the secure channel.

12 Claims, 5 Drawing Sheets

(51) Int. Cl.
   *H04L 9/08* (2006.01)
   *H04W 12/06* (2009.01)
   *H04W 12/04* (2009.01)
   *H04W 84/18* (2009.01)

(52) U.S. Cl.
   CPC ........... *H04W 12/06* (2013.01); *H04L 63/162* (2013.01); *H04W 12/04* (2013.01); *H04W 84/18* (2013.01)

(58) Field of Classification Search
   USPC .......................................................... 726/7
   See application file for complete search history.

(56) References Cited

OTHER PUBLICATIONS

J. Van Der Merwe et al., "A Survey on Peer-to-Peer Key Management for Mobile Ad Hoc Networks," ACM Computing Surveys, vol. 39, No. 1, Apr. 1, 2007, pp. 1-45, XP002722092.

Bocheng Lai et al., "Scalable Session Key Construction Protocol for Wireless Sensor Networks," IEEE Workshop on Large Scale Real-Time and Embedded Systems, 2002.

E. Yüksel et al., "ZigBee-2007 Security Essentials", in Proceedings of the 13rd Nordic Workshop on Secure IT-systems (NordSec 2008), pp. 65-82, 2008.

David W. Carman, "New Directions in Sensor Network Key Management," International Journal of Distributed Sensor Networks, vol. 1, No. 1, pp. 3-15, 2005.

Farshid Delgosha et al., "MKPS: a Multivariate Polynomial Scheme for Symmetric Key-Establishment in Distributed Sensor Networks," The ACM International Wireless Communications and Mobile Computing Conference, 2007.

Abhishek Gupta et al., "Deterministic Schemes for Key Distribution in Wireless Sensor Networks," In Proceedings of the Third International Conference on Communication Systems Software and Middleware and Workshops, IEEE Computer Society, 2008.

Y.Qiu et al. "Lightweight Key Establishment and Management Protocol in Dynamic Sensor Networks (KEMP)," IEFT Internet-Draft draft-qiu-roll-kemp-01, Mar. 12, 2012.

* cited by examiner

METHOD AND DEVICE FOR FORMING A SECURE WIRELESS NETWORK WITH LIMITED RESOURCES

CROSS-REFERENCE TO RELATED APPLICATIONS

This application is a National Stage of International patent application PCT/EP2014/056174, filed on Mar. 27, 2014, which claims priority to foreign French patent application No. FR 1352815, filed on Mar. 28, 2013, the disclosures of which are incorporated by reference in their entirety.

FIELD OF THE INVENTION

The invention relates to the field of security in communication networks, specifically that of the security of networks with limited resources.

PRIOR ART

Networks with limited resources are comprised of devices or nodes with limited computing, memory and energy capacities, such as emergent networks with machine-to-machine communications, wireless sensor networks and vehicular networks.

Existing security solutions for networks with limited resources are based upon a pro-active approach. In the majority of these solutions, it is assumed that the nodes forming the network are provided with shared keys which are used for network authentication and access control. These keys are pre-installed manually in each network node, such that a dedicated infrastructure exists for the management of keys or certificates.

Certain existing solutions ensure the security of communications in networks with limited resources by the use of keys which are pre-distributed manually in the nodes.

Other solutions use network keys which are common to all the nodes, as described in the document by B. Lai et al., "Scalable session key construction protocol for wireless sensor networks", IEEE Workshop on Large Scale Real-Time and Embedded Systems, 2002, or in the document by E. Yüksel et al., "ZigBee-2007 Security Essentials", In Proceedings of the 13rd Nordic Workshop on Secure IT-systems (NordSec 2008), pages 65-82, 2008. However, this approach renders networks susceptible to the compromising of keys. Moreover, the sharing of keys with each node on the network is costly, in terms of the consumption of memory capacity, and does not provide an extensible solution. In addition, one node generally shares keys with only a proportion of the nodes on the network, often chosen at random.

Accordingly, certain solutions use keys which are shared by pairs of nodes, as described in the document by D. W. Carman, "New Directions in Sensor Network Key Management", International Journal of Distributed Sensor Networks, Vol. 1, No. 1, pp. 3-15, 2005, or the document by F. Delgosha et al., "MKPS: a multivariate polynomial scheme for symmetric key-establishment in distributed sensor networks", The ACM Int'l Wireless Communications and Mobile Computing Conference, 2007, or the document by A. Gupta and J. Kuri, "Deterministic schemes for key distribution in wireless sensor networks", In Proceedings of the Third International Conference on Communication Systems Software and Middleware and Workshops, IEEE Computer Society, 2008.

However, if an initial node needs to communicate with a target node with which it shares no predetermined keys, this node needs to establish a trust relationship, involving the collaboration of nodes on the network which might share keys with the target node. The initial node may also transmit a request to a local or remote server in order to obtain a common key with the target node. This approach is described in the document by Y. Qiu et al. "Lightweight Key Establishment and Management Protocol in Dynamic Sensor Networks (KEMP)," IETF Internet-Draft draft-qiu-roll-kemp-01, Mar. 12, 2012. In this solution, the initial node can only share a key with one node at a time. This approach permits the authentication of a node on its neighboring router via its authentication server, together with the distribution of a common key for the purposes of access control. At node level, the shared key is generated locally whereas, at router level, the key is transmitted by the server on a secure channel. For the establishment of security associations with other neighboring nodes, the initial node must re-execute a protocol (KEMP) for each neighboring node, in the same way as if a new neighboring router were involved.

Known approaches, although offering alternative solutions, do not constitute a sufficiently rapid and effective solution, in terms of resources, energy consumption at node level or passband, for the establishment of shared keys between a number of neighboring nodes in a network with limited resources.

The invention proposed in the present document permits the fulfillment of these requirements.

The solution provided in the present invention facilitates dynamic formation of a network of nodes with limited resources, whilst offsetting the disadvantages of a conventional approach.

SUMMARY OF THE INVENTION

An object of the present invention is the provision of a method for the formation of a secure network for nodes with limited resources, between which no previous trust relationship exists.

Advantageously, the formation of the network does not require a dedicated local security infrastructure, and is based upon a remote trust entity.

A further object of the present invention is a facility for the authentication of a node and the secure access thereof to a network with limited resources, by the secure assignment thereto of all the requisite cryptographic hardware, and specifically by the assignment thereto of keys shared with neighboring nodes.

Advantageously, the present invention does not require the existence of a trust relationship between the administrative domain of the access network and that of the network with limited resources. The access network with a remote infrastructure may be included in a different administrative domain, with no trust relationship with the administrative domain incorporating the nodes which form the secure network.

Further advantageously, the present invention permits the progressive addition of nodes, while securing their access to the secure network thus formed.

Advantageously, the present invention permits a reduction in the number of messages exchanged for the establishment of security associations between neighboring nodes in a network with limited resources. Cryptographic hardware established between the constituent nodes of the secure network is not disclosed to entities other than the latter, with the exception of the remote trust entity responsible for the delivery thereof. Specifically, entities on the access network with a remote infrastructure are not aware of this cryptographic hardware.

Further advantageously, the present invention permits a node, in a single step, to complete authentication on the secure infrastructure and to complete the simultaneous acquisition of keys shared with its neighboring nodes.

Advantageously, the present invention may be implemented in situations where devices with limited resources need to create a secure network in a hostile or hard-to-access environment.

Accordingly, the invention may be applied in operations conducted by the emergency services, such as the ambulance service, the fire service, the police, civil defense or humanitarian aid agencies. Specifically, these will include operations in crisis situations, such as major incidents, fires or acts of terrorism, which require the establishment of communications between the devices used by response services, in the interests of coordinating their actions and improving crisis management.

A secure network thus established between the various services facilitates the evaluation of requirements and impacts, and provides information on access to property, infrastructures or population groups. Communications between the different emergency services therefore permit the optimized allocation of financial, equipment and human resources, thereby enhancing rapid-response capability. Network security is a necessary feature, and may be based upon a remote security infrastructure which is accessed by the emergency services via a third-party access network, for example a cellular network.

A further context in which the present invention might be advantageously applied is that of sensors/actuators deployed in a hostile environment. Sensors or actuators may be deployed in a hostile or hard-to-access environment—battlefields, aid zones in case of losses or disasters—in order to obtain vital information or to control the environment. These devices must operate with no human intervention. However, the dedicated security infrastructure may not be integrated in their environment, and these devices are therefore required to employ unreliable third-party infrastructures—cellular networks, satellite networks or foreign communication installations—for the management of their security. Accordingly, this invention permits the self-organization of such devices to form a secure network.

Advantageously, in its applications, the invention permits the dynamic, rapid and effective creation of security associations between the constituent devices of the network, which proceeds progressively as nodes are incorporated into the network.

For the achievement of the desired results, a method, a device and a computer software program are proposed.

Specifically, in a communication network comprising a plurality of nodes, a method for the formation of a secure wireless network between nodes with limited resources on the communication network, wherein the method comprises the following steps:

the generation for a requesting node, from nodes with limited resources, of a list LV of neighboring nodes with limited resources, whereby the list includes the identities of said nodes with limited resources adjacent to the requesting node;

the establishment of a secure channel between the requesting node and an authentication entity, by the generation of a master key for the generation of shared keys (nKGS) for the requesting node;

the transmission to the authentication entity, via the secure channel, of the list of identities of neighboring nodes with limited resources;

the reception from the authentication entity, via the secure channel, of the master session keys (nMSKs) shared with the neighboring nodes of limited resources on said list; and the establishment of a security association with each neighboring node with limited resources, whereby each security association is established on the basis of the corresponding master session key for the neighboring node with limited resources.

In one form of embodiment, the step for the generation of a list of neighboring nodes comprises the following steps:

the discovery of neighboring nodes to the requesting node; and the selection of a list of relevant neighboring nodes from the neighboring nodes thus discovered.

Advantageously, the step for the discovery of neighboring nodes deploys a protocol for the discovery of nodes situated at a distance of one hop on the same link.

In a specific form of embodiment, the step for the selection of relevant neighboring nodes involves the selection of neighboring nodes which are subject to the same security authority.

In one variant, the step for the selection of relevant neighboring nodes involves the selection of neighboring nodes which are included in the same administrative domain.

In one form of embodiment, the step for the establishment of a secure channel comprises the following steps:

authentication with the authentication entity; and the generation of a master key for the generation of keys shared with neighboring nodes.

Advantageously, the authentication step involves the deployment of an Extensible Authentication Protocol (EAP).

In one form of embodiment, the method comprises, ahead of the step for the reception of master session keys, a step for the generation by the authentication entity of a plurality of master session keys for each node on the list LV which includes the requesting node in its own list LV.

Advantageously, the steps for the generation of keys employ a chopping function for the derivation of the keys.

In a preferential implementation, the network of nodes is a network of the mobile ad hoc network type, and is based upon level 2 and/or level 3 communications.

Advantageously, the invention is implemented as a system for the formation of a secure wireless network between nodes with limited resources on a communication network, and comprises resources for the deployment of the steps of the method described.

A computer software program comprising code instructions for the execution of the steps of the method described, where the program is run on a computer.

DESCRIPTION OF FIGURES

Various aspects and advantages of the invention are presented in the description of a preferred form of embodiment of the invention, which is not provided by way of limitation, with reference to the figures below.

DETAILED DESCRIPTION OF THE INVENTION

Figure 1:
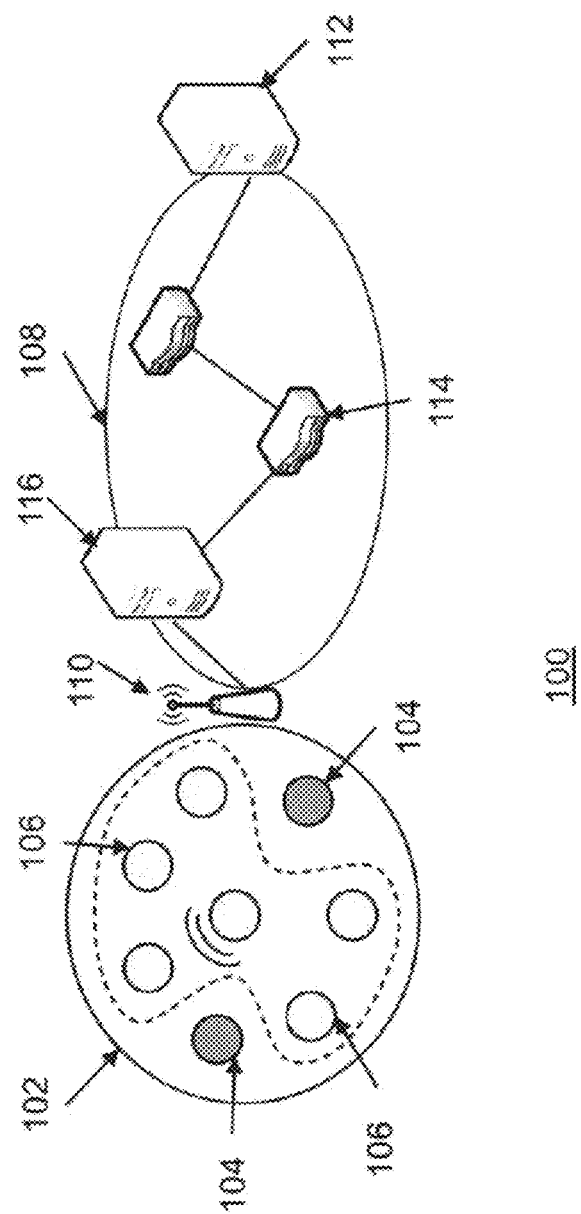
FIG. 1 shows a topological representation of a communication infrastructure, in which the invention is advantageously implemented.

FIG. 1 illustrates an example of a communication infrastructure 100 in which the invention is advantageously implemented. A network 102 comprises a plurality of nodes (104, 106) with limited resources.

In the context of the invention, a node is a static or mobile communicating device, with limited resources, which connects to the network with limited resources.

In a preferential implementation, the network is of the mobile ad hoc network type, or MANET, which is a wireless network capable of self-organization with no predefined infrastructure. Examples of networks with limited resources include networks of sensors deployed in the industrial sector or in vehicular networks.

Within the network, a number of nodes (106) wish to access a resource or service which is associated with a remote infrastructure. Accordingly, the invention applies to a general context in which a group of nodes (106), whether mobile or static, are intended to form a secure wireless network. In this context, the nodes concerned (106) connect to a network access infrastructure (108) via an access point (110), which may be a wifi terminal or a cellular antenna, in order to communicate with a remote security entity (112). In a preferential implementation, the remote security entity (112) comprises at least one authentication server.

The authentication server (112), which is responsible for the authentication of nodes, stores the cryptographic data required for the authentication of each of the nodes in the group (106). As detailed hereinafter, each node, further to its authentication, receives keys which are shared with neighboring nodes which have been authenticated. These keys are used for the establishment of secure communications in the network thus formed.

Nodes on the network with limited resources access the remote security entity via a third-party communication network (108), which may be a cellular network or the Internet. The network access infrastructure (108) may incorporate intermediate entities such as routers (114) and/or intermediate servers (116).

In the interests of the simplicity of the description, and not by way of limitation of the invention, although the example illustrated in FIG. 1 shows a finite number of entities and connections, an expert in the field will be able to extend the principles described in the present invention to encompass a plurality and a variety of nodes and types of servers, bridges or connections (wireless, mobile, very high capacity).

The network of nodes (102) may be based upon level 2 communications (for example, 802.15.4 or 802.11) and/or level 3 communications (for example, IP). Depending upon the protocols applied, multicast or broadcast communication schemes may be employed.

Figure 2:
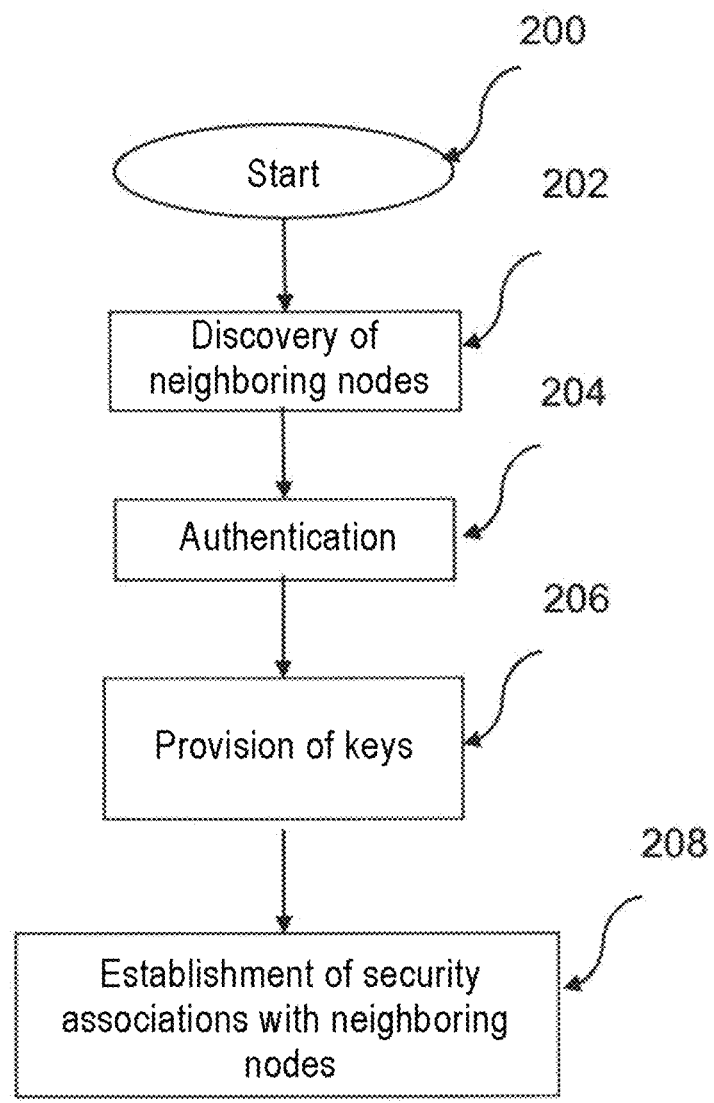
FIG. 2 illustrates the steps deployed for the authentication and access control of a node to a network with limited resources, in accordance with the method described in the present invention.

FIG. 2 illustrates the steps deployed for the authentication and access control of a newly-incorporated node on the network with limited resources, in accordance with the method disclosed in the present invention. The process starts (200) when a new node requests connection to a network with limited resources.

A first step (202) involves the discovery of neighboring nodes. This step permits a node requesting connection to the network with limited resources to discover its neighboring nodes.

In a preferential implementation, a protocol which permits the discovery of nodes at an interval of one hop on the same link is used. An example of a protocol of this type is described by T. Narten et al., in "Neighbor Discovery for IP version 6 (IPv6)", IETF RFC 4861, September 2007.

Other simple approaches by flooding, described as "request flooding schemes" and involving a fixed number of hops, may also be used for the discovery of neighboring nodes at an interval of several hops.

Alternatively or additionally, a node may also discover its neighbors by reference, for example, to the reception of call messages—for example a "Hello" message—which are transmitted periodically by the latter.

The discovery phase ends upon the completion of the discovery protocol for neighboring nodes. Depending upon the protocol used, the discovery phase may end, for example, upon the expiry of a waiting time (timeout).

Step 202 permits the selection by the requesting node of relevant neighboring nodes. Upon the completion of this phase, the requesting node holds a list "$L_v$" of the identities of neighboring nodes selected.

As a selection criterion, the requesting node may choose the association of neighboring nodes with the same security authority. In another variant of implementation, the selection of relevant neighboring nodes may be based upon inclusion in the same administrative domain.

In a particular form of embodiment, the identities selected may employ the Network Access Identifier (NAI) syntax, as described in the document by B. Aboba and M. Beadles, "The Network Access Identifier", IETF RFC 2486, January, 1999. In this case, the selection may be based upon the "realm" domain element of identities, whereby the requesting node selects the neighboring nodes which share the same domain as itself.

The process continues in step 204 with end-to-end authentication. This step permits the authentication of the requesting node on the remote entity, in order to obtain access to the network with limited resources. In a preferential implementation, a protocol of the "Extensible Authentication Protocol" type, as described in the document by B. Aboba et al. "Extensible Authentication Protocol (EAP)", IETF RFC 3748, June 2004, is used. Another example of an authentication protocol is the AKA protocol (Authentication and Key Agreement) used in 3GPP UMTS and LTE communications.

During this step, a secure channel is established between the requesting node and the remote entity. The shared channel is notably protected for both confidentiality and integrity. The secure channel permits the requesting node and the remote entity to share a common key. This key is generally described as the "Neighbor Key Generation Seed" (nKGS). As described hereinafter, this secure channel permits the transmission of keys shared with neighboring elements, described as nMSK.

In a preferential implementation, if the authentication protocol used is (EAP), the nKGS key is derived from the key described as the "Extended Master Session Key" (EMSK) which is generated in conjunction with authentication using the EAP protocol, and is only shared between the node and the authentication entity.

In the next step (206), the requesting node transmits the list of the identities of the neighboring nodes selected to the remote entity via the secure end-to-end channel. The requesting node may also transmit additional information on its neighboring environment including, for example, information on the density or quality of the transmission channel.

Upon the reception of this list, the remote entity derives from the master key (nKGS) of each neighboring node which has added the requesting node to its own list "$L_v$" a master session key (nMSK) or "Neighbor Master Session Key". A series of master session keys nMSK is generated for all the neighboring nodes having the requesting node in their own list Lv.

The remote entity then transmits the series of keys (nMSK) thus derived to the requesting node via the secure channel. Each key thus derived is then shared between the requesting node and the corresponding neighboring node.

The response message from the remote entity may also contain other keys, for example a group key and/or other information including, for example, the identities of local network servers.

The derived keys are used in a following step 208 to establish security associations between the requesting node and the corresponding neighboring nodes, on the basis of the keys (nMSK) received.

Figure 3:
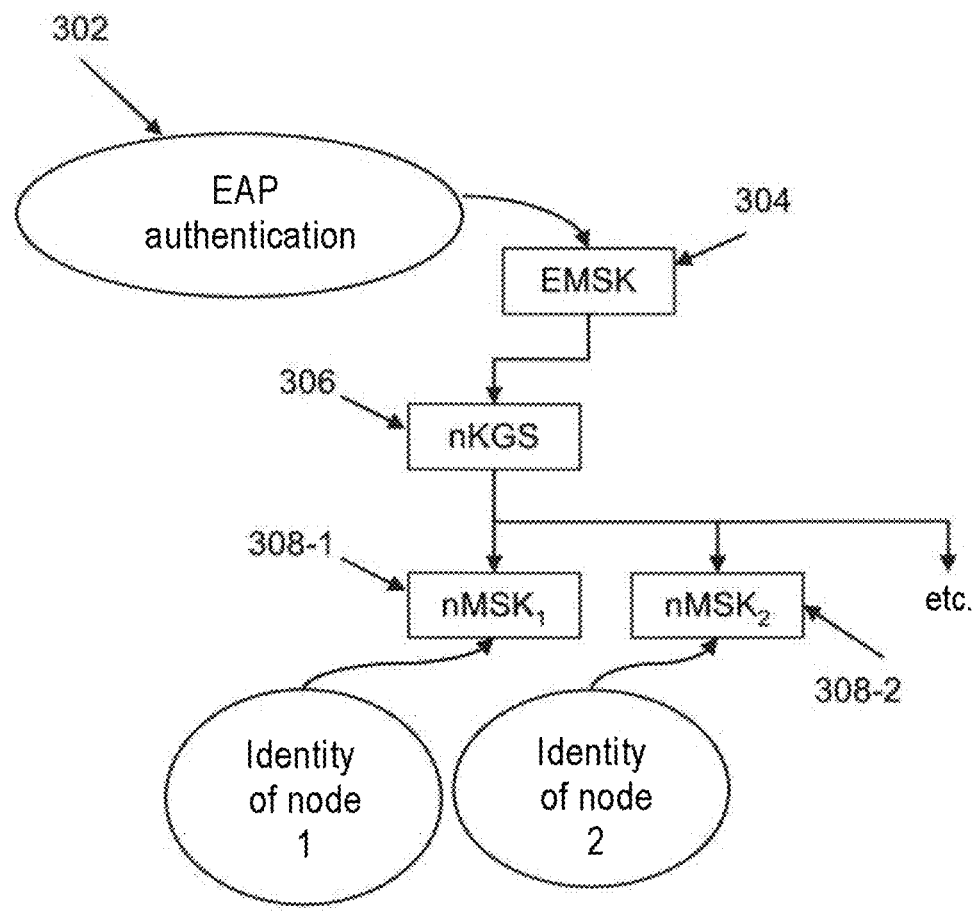
FIG. 3 illustrates the hierarchical ranking of keys on the requesting node and its neighboring nodes, in a form of embodiment based upon the EAP protocol.

FIG. 3 illustrates the hierarchical ranking of keys for the requesting node and its neighboring nodes in a form of embodiment based upon the EAP protocol. Further to successful authentication (302) on a remote entity, a master key nKGS (306) is derived from the EMSK key (304) which has itself been generated in the course of authentication. The master session keys (308-1, 308-2, etc.) are then derived for each neighboring node identified in the list "$L_v$" of the requesting node which has itself accepted the requesting node in its own list.

Figure 4:
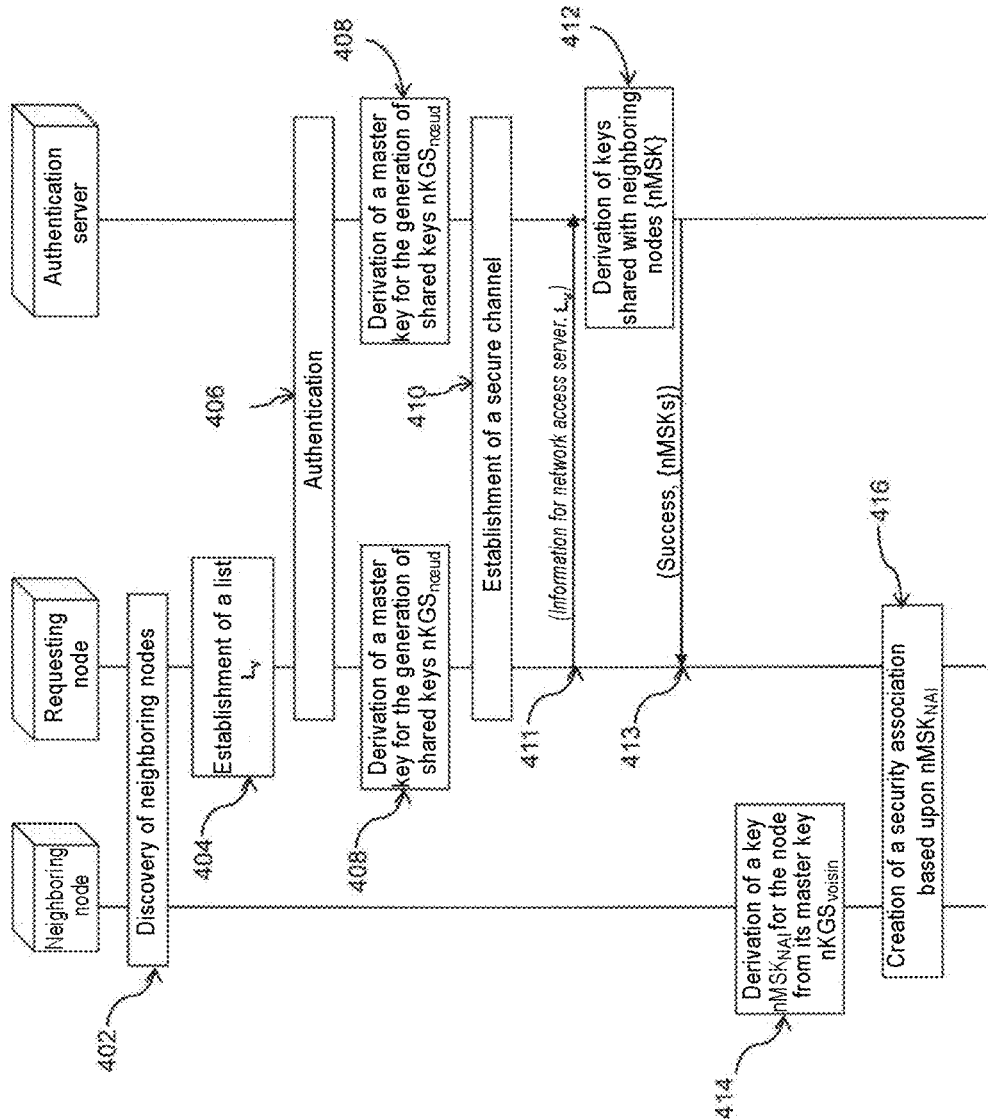
FIG. 4 illustrates the exchanges completed between the nodes on a network and the authentication server, in a preferential implementation of the invention.

FIG. 4 illustrates the exchanges completed between the nodes on a network and the authentication server in a preferential implementation of the invention based upon the EAP protocol.

During the phase for the discovery of neighboring nodes (402), the requesting node generates (404) a list "$L_v$" containing the identities of the neighboring nodes selected. It then establishes an authentication process (406) with the remote authentication entity, using the EAP authentication protocol. During authentication, an EMSK key is deduced in accordance with the EAP protocol. On the basis of this EMSK key, a master key nKGS for the generation of keys shared with neighboring nodes is derived (408).

In one form of embodiment, a cryptographic chopping function (H) is used to derive the master key by the application of the following function:

$nKGS_{noeud}=H$ (EMSK, "nMSK Generation Seed")

During its authentication, the requesting node establishes a secure channel (410), in respect of both confidentiality and integrity, with the remote authentication entity. This channel is used to transmit the list $L_v$ of the identities of the neighboring nodes selected to the authentication server. Upon the reception by the server of the list $L_v$ of the identities of the selected nodes, a plurality of master session keys is generated (412). The remote entity derives a master session key nMSK for each node in the list which has itself selected the requesting node in its own list $L_v$. Each master session key is generated using the master key for the generation of shared keys $nKGS_{voisin}$ associated with this neighboring node (414).

In one form of embodiment, for the derivation of a master session key nMSK for a node on the list, a cryptographic chopping function (H) and the "Network Access Identifier" (NAI) identity are used, in accordance with the following function:

$nMSK_{NAI}=H$ ($nKGS_{voisin}$, NAI)

where the NAI identity of the node is the network access identifier for the node which is authenticated on the network.

The derivation of master keys for the generation of shared keys nKGS and of master session keys $nMSK_s$ by means of a chopping function are provided by way of an example. An expert in the field will understand that any other key derivation function, such as that described in RFC 5869 "HMAC-based Extract-and-Expand Key Derivation Function (HKDF)" may be used for this purpose.

The master session keys $\{nMSK_s\}$ thus derived are transmitted by the remote entity to the requesting node via the secure channel.

The requesting node uses the keys received $\{nMSK_s\}$ to establish security associations (416) with neighboring nodes.

Figure 5:
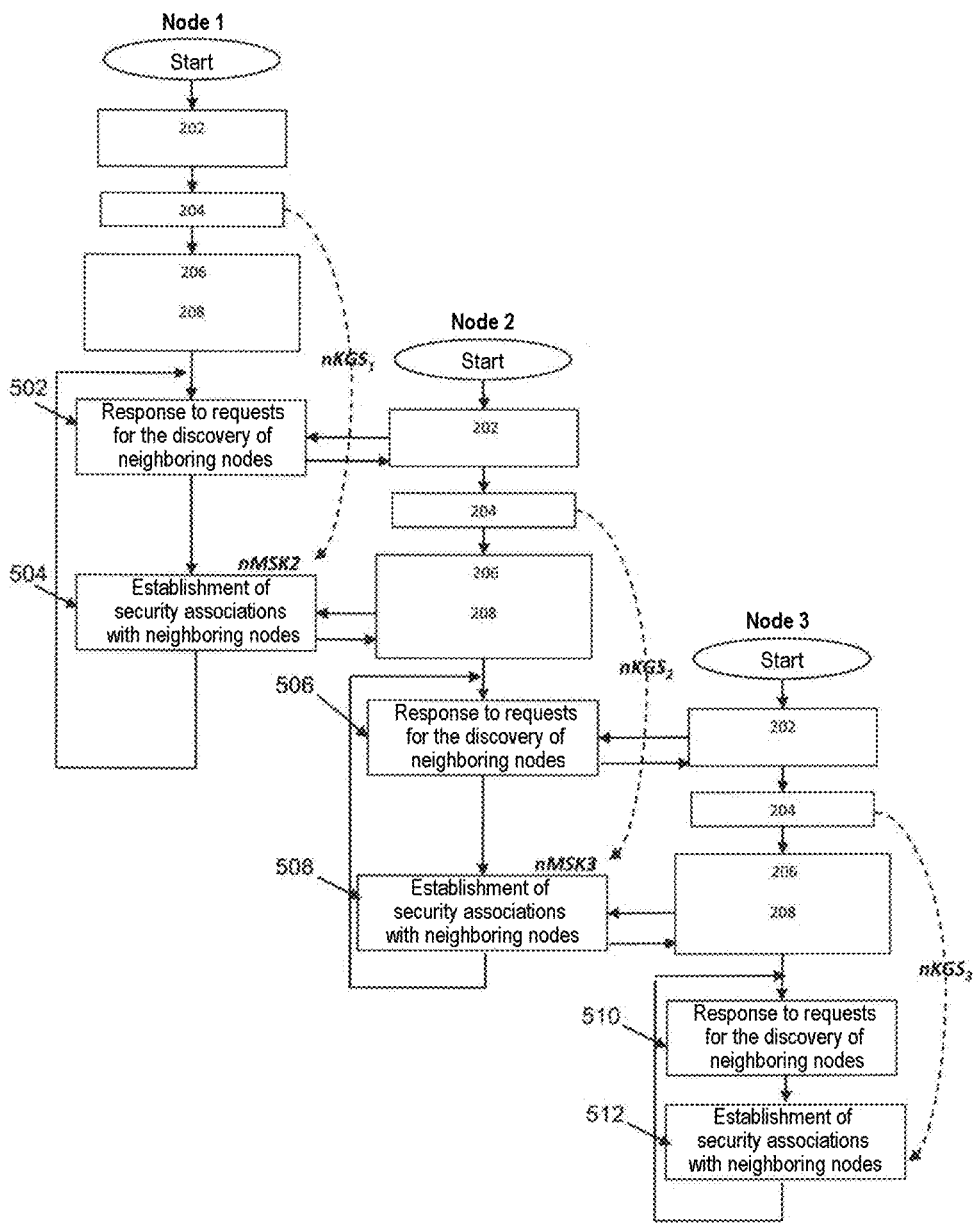
FIG. 5 illustrates the steps deployed by the method according to the present invention, for the successive inclusion of new nodes on the secure network.

Using the example of three nodes (node 1, node 2, node 3), FIG. 5 illustrates the steps deployed in the method according to the present invention for the successive inclusion of new nodes on the secure network. As described previously, the invention permits progressive formation of a secure network for neighboring nodes.

A first requesting node (node 1) initiates the process for the discovery of neighboring nodes and the authentication process on the remote entity by the deployment of steps 202 to 208, as described with reference to FIG. 2.

In a preferential implementation, a node situated within the range of the access point (110) is firstly authenticated on the remote entity (112). Further to successful authentication, the requesting node responds (502) to requests for the discovery of its neighboring nodes. The requesting node then relays the authentication requests received from neighboring nodes and establishes (504) security associations with the latter. The neighboring nodes thus authenticated execute the same operations as the first nodes authenticated, respectively steps (506, 508) for node 2, and (510, 512) for node 3.

Accordingly, a requesting node receives a series of master session keys $\{nMSK_s\}$ from the remote entity in conjunction with its authentication, and the neighboring nodes execute the local derivation of their key ($nMSK_2$, $nMSK_3$, etc.), on the basis of their own master keys ($nKGS_1$, $nKGS_2$, etc.) respectively.

In certain situations where a number of nodes transmit their authentication requests simultaneously, the remote server may establish a priority protocol for the preferred authentication of one node prior to its neighboring node or neighboring nodes.

An expert in the field will understand that variations may be applied to the preferential method described, whilst maintaining the principles of the invention. Accordingly, although the examples described are based upon a preferential protocol, it is possible to use other authentication protocols.

The present invention may be implemented on the basis of hardware and/or software components. It may be available as a computer software program on a computer-readable medium. This medium may be electronic, magnetic, optical, electromagnetic or an infrared transmission medium. Media of this type include, for example, semi-conductor memories (Random Access Memory RAM, Read-Only Memory ROM), tapes, magnetic or optical disks or diskettes (Compact Disk-Read Only Memory (CD-ROM), Compact Disk-Read/Write (CD-R/W) and DVD).

The invention claimed is:

1. In a communication network comprising a plurality of nodes, a method for the formation of a secure wireless network between nodes with limited resources on the communication network, wherein the method comprises the following steps:
   generating for a requesting node, from nodes with limited resources, a list LV of neighboring nodes with limited resources, whereby the list includes identities of said neighboring nodes with limited resources adjacent to a requesting node;
   establishing a secure channel between the requesting node and an authentication entity, by generation of a master key for generation of shared keys (nKGS) for the requesting node;
   transmitting to the authentication entity, via the secure channel, of the list of identities of neighboring nodes with limited resources;
   receiving from the authentication entity, via the secure channel, of master session keys (nMSKs) shared with the neighboring nodes of limited resources on said list; and
   establishing a security association with each neighboring node with limited resources, whereby each security association is established on the basis of a corresponding master session key for the neighboring node with limited resources.

2. The method as claimed in claim 1, where the step of generating a list of neighboring nodes comprises the following steps:
   discovering neighboring nodes to the requesting node; and
   selecting a list of relevant neighboring nodes from the neighboring nodes thus discovered.

3. The method as claimed in claim 2, wherein the discovering deploys a protocol for the discovery of nodes situated at a distance of one hop on the same link.

4. The method as claimed in claim 2, wherein the step of discovering a list of relevant neighboring nodes involves the selection of neighboring nodes which are subject to the same security authority.

5. The method as claimed in claim 2, wherein the step of discovering a list of relevant neighboring nodes involves the selection of neighboring nodes which are included in the same administrative domain.

6. The method as claimed in claim 1, wherein the step of establishing a secure channel comprises the following steps:
   authentication with the authentication entity; and
   generating a master key for generation of keys shared with neighboring nodes.

7. The method as claimed in claim 6, wherein the authentication step involves deployment of an Extensible Authentication Protocol (EAP).

8. The method as claimed in claim 1 additionally comprising, ahead of the step of the receiving of the master session keys, a step of generating by the authentication entity a plurality of master session keys for each node on the list LV which includes the requesting node on its own list LV.

9. The method as claimed in claim 6, wherein the generating of the master session keys employ a chopping function for the derivation of the keys.

10. The method as claimed in claim 1, wherein the network of the plurality of nodes is a mobile ad hoc network type, and is based upon level 2 and/or level 3 communications.

11. A system for the formation of a secure wireless network between nodes with limited resources on a communication network comprising a plurality of nodes, wherein the system comprises resources for deployment of a method comprising:
   generating for a requesting node, from nodes with limited resources, a list LV of neighboring nodes with limited resources, whereby the list includes identities of said neighboring nodes with limited resources adjacent to a requesting node;
   establishing a secure channel between the requesting node and an authentication entity, by generation of a master key for generation of shared keys (nKGS) for the requesting node;
   transmitting to the authentication entity, via the secure channel, of the list of identities of neighboring nodes with limited resources;
   receiving from the authentication entity, via the secure channel, of master session keys (nMSKs) shared with the neighboring nodes of limited resources on said list; and
   establishing a security association with each neighboring node with limited resources, whereby each security association is established on the basis of a corresponding master session key for the neighboring node with limited resources.

12. A computer software program stored on a non-transitory computer readable storage medium, the computer software program comprising code instructions for execution of a method for the formation of a secure wireless network between nodes with limited resources on a communication network comprising a plurality of nodes, when said computer software program is run on a computer, said method comprising:
   generating for a requesting node, from nodes with limited resources, a list LV of neighboring nodes with limited resources, whereby the list includes identities of said neighboring nodes with limited resources adjacent to a requesting node;
   establishing a secure channel between the requesting node and an authentication entity, by generation of a master key for generation of shared keys (nKGS) for the requesting node;
   transmitting to the authentication entity, via the secure channel, of the list of identities of neighboring nodes with limited resources;
   receiving from the authentication entity, via the secure channel, of master session keys (nMSKs) shared with the neighboring nodes of limited resources on said list; and
   establishing a security association with each neighboring node with limited resources, whereby each security association is established on the basis of a corresponding master session key for the neighboring node with limited resources.

* * * * *